US006987514B1

(12) United States Patent
Beresin et al.

(10) Patent No.: US 6,987,514 B1
(45) Date of Patent: Jan. 17, 2006

(54) VOICE AVATARS FOR WIRELESS MULTIUSER ENTERTAINMENT SERVICES

(75) Inventors: Evgenij Beresin, Helsinki (FI); Jonathan Pugh, Sydney (AU)

(73) Assignee: Nokia Corporation, Espoo (FI)

( * ) Notice: Subject to any disclaimer, the term of this patent is extended or adjusted under 35 U.S.C. 154(b) by 768 days.

(21) Appl. No.: 09/710,618

(22) Filed: Nov. 9, 2000

(51) Int. Cl.
*H04H 7/00* (2006.01)
*H04M 3/00* (2006.01)

(52) U.S. Cl. .................... 345/473; 345/473; 345/474; 455/3.06; 455/418; 455/518

(58) Field of Classification Search ............... 455/563, 455/412.1, 413, 414.1, 564, 3.06, 418–420, 455/507, 517, 518; 704/270, 270.1, 272; 381/61; 345/473–474
See application file for complete search history.

(56) References Cited

U.S. PATENT DOCUMENTS 5,911,129 A * 6/1999 Towell ................... 704/270.1
6,330,428 B1 * 12/2001 Lewis et al. ............. 455/67.11
6,397,080 B1 * 5/2002 Viktorsson et al. ......... 455/558
6,404,872 B1 * 6/2002 Goldberg et al. ....... 379/201.11
6,453,294 B1 * 9/2002 Dutta et al. .............. 704/270.1
6,463,412 B1 * 10/2002 Baumgartner et al. ...... 704/246
6,539,354 B1 * 3/2003 Sutton et al. ............... 704/260

FOREIGN PATENT DOCUMENTS

EP          0 843 168 A2 *  5/1998

* cited by examiner

*Primary Examiner*—Simon Nguyen
(74) *Attorney, Agent, or Firm*—Cohen, Pontani, Lieberman & Pavane

(57) ABSTRACT

A voice avatar module is connected in a wireless terminal or a server for implementing a voice avatar for multiuser entertainment services allowing voice-based communication over a wireless network. The voice avatar module has a memory including a plurality of voice avatars. A user of the wireless device selects one of the voice avatars for modifying the user's voice. The user then enables the selected voice avatar so that all participants hear the modified voice of the user.

35 Claims, 4 Drawing Sheets

VOICE AVATARS FOR WIRELESS MULTIUSER ENTERTAINMENT SERVICES

BACKGROUND OF THE INVENTION

1. Field of the Invention

The present invention relates to a voice avatar module for applying voice modification technologies to voice-based communication between wireless communication devices for wireless multiuser entertainment services on the Internet.

2. Description of the Related Art

In general, an avatar is an electronic representation of a person in a virtual reality space. Users of the Internet "wear" avatars to visit and explore different virtual reality spaces. The users control the motion and behavior of the avatar in the virtual reality space, meet other avatars, and communicate with the other avatars. There are many sites on the internet which comprise virtual reality spaces. These sites typically offer a selection of standard avatars. Other sites are dedicated to the development of avatars which allow users to create a new avatar according to the user's specification.

Avatars are driven, i.e., controlled, by a user. They can articulate speech, express emotions, demonstrate gestures, and/or move around in virtual reality space. Traditional virtual reality avatars are designed for viewing on screen devices with rich graphic capabilities which are not typically available for wireless devices. Accordingly, traditional avatars cannot be downloaded to a wireless client device.

Internet entertainment services typically provide two ways of user communication, i.e., text-based and voice-based. Text-based communication is the traditional and widely accepted communication method used in Internet chat rooms. Voice-based communication is a more natural way to communicate for most people.

It looks promising to bring the avatar concept to voice-based communication on the Internet by introducing voice avatars that mask a user's original voice. Even more beneficial is the use of such avatars in pocket-size wireless devices, since the majority of these devices are voice-centric.

SUMMARY OF THE INVENTION

It is an object of the present invention to implement voice avatars for Internet multiuser entertainment services, especially wireless services.

As used herein, a voice avatar is a software program which implements some voice modification technique. A wide selection of voice modification technologies and products are available for commercial use. These technologies include transforming a person's voice to another voice, morphing a person's voice with a sound to produce an intermediate sound, and applying special effects, such as reverberation. The software program works like a voice signal filter which transforms a user's digitally encoded voice. The program may use data files holding parameters of a voice transformation algorithm so that the same program may be used for many avatars. The voice avatars may comprise software components with standard interfaces which may be plugged into any Internet service supporting it.

The voice avatars of the present invention may be used with voice-based Internet entertainment services that allow voice-based communication between participants such as, for example, chats and multiplayer games. According to the present invention, a voice avatar module for implementing the voice modification may be arranged in a user's mobile terminal, i.e., client-side avatars, or the voice avatar module may be arranged in a server connected to a network such as the internet, i.e., server-based avatars. In the server-based avatars embodiment, user registration records on the server associates a user with an avatar. The user registration record may contain the avatar itself, the location of the avatar in a memory in the server, or a link to the voice avatar that the user has selected. Then the voice communication channel that the user is using will filter sounds coming through that voice avatar at the server and distribute it to all listening parties. In this embodiment, sound filtering occurs at the server. In the client-based avatar embodiment, the sound filtering occurs at the user's mobile terminal. The user may download a voice avatar to the wireless mobile terminal from another server or create a voice avatar at the wireless mobile terminal and store the voice avatar at the wireless mobile terminal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 2a is a display of the mobile terminal of FIG. 2 during use according to the present invention;

DETAILED DESCRIPTION OF THE PRESENTLY PREFERRED EMBODIMENTS

Figure 1:
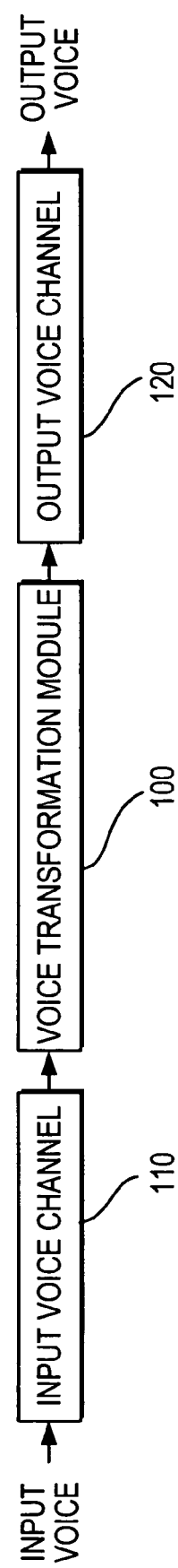
FIG. 1 is a block diagram of a voice avatatar module.

FIG. 1 shows a simple block diagram of a voice transformation module 100 which applies a voice modification to an input voice received from an input voice channel 110 and outputs an output voice on an output voice channel 120. The module works like a voice signal filter which modifies the input voice 110 in a desired way. A wide selection of voice modification technologies and products are available for commercial use. These technologies include transforming a person's voice into another voice, morphing a person's voice with a sound to produce an intermediate sound, and applying a special sound effect such as reverberation. The voice avatar module comprises a software program which implements one or more of these voice modification techniques on a digitally encoded input voice. The program may use data files holding parameters of a voice transforming algorithm so that the same program may be used for implementing multiple avatars which differ by parameter settings.

The creation of voice avatars requires specific knowledge of sound modification technologies. The change implemented by the voice avatar preferably makes the original voice unrecognizable from the output voice. However, the output voice should remain emotionally expressive and the speech should be understandable.

Figure 2:
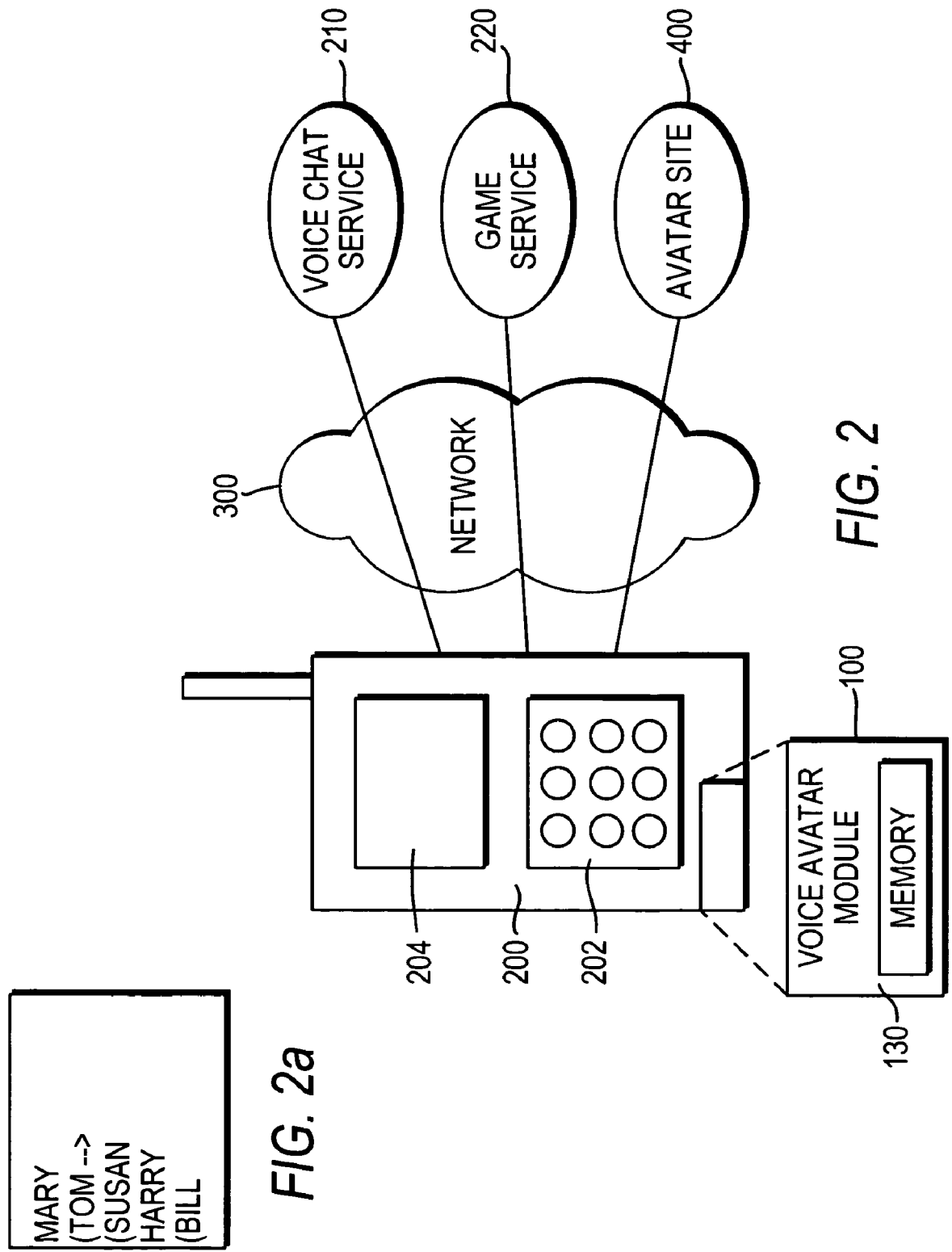
FIG. 2 is a block diagram showing a client-side embodiment of the present invention.

FIG. 2 shows a client-side implementation of the present invention in which the voice avatar module 100 is arranged in a wireless mobile terminal 200. The wireless mobile terminal 200 comprises any mobile electronic device that allows wireless communication via a wireless network such as, for example, a mobile phone, a Personal Digital Assistant (PDA), and a laptop or notebook computer having a wireless modem. The voice avatar module 100 is shown in an enlarged block in FIG. 2 to show that the voice avatar module includes a memory 130. Two entertainment services that allow voice-based communication between users include a voice chat service 210 and a game service 220. The user mobile terminal 200 may connect to either of these services 210, 220 via a wireless network 300 which may include the Internet and the voice-based communication may use Voice-over-Internet-Protocol (VoIP) protocols. To use a voice avatar according to this embodiment, the user of terminal 200 first selects a desired voice avatar using the input keys 202 on the wireless mobile terminal 200 before connecting with a service. The selection of a voice avatar may comprise selecting a voice avatar from a list of voice avatars in a memory 130. Although the memory 130 is shown as being a dedicated part of the voice avatar module 100, the memory 130 may also be a general memory of the wireless mobile terminal 200. After selecting a voice avatar, the user may sample the output voice. If the user does not want to enable the selected voice, the user may select another voice avatar from the memory 130 until a suitable voice avatar is found. Once a suitable voice avatar is found, the user enables the voice avatar, and the user's voice will be transformed by the selected voice avatar until the user disables it. Once a voice avatar is selected, the user may enter any service which uses voice-based communication, such as the voice chat service 210 or a game service 220. Once the user enters a service, a display 204 on the wireless mobile terminal 200 may list the current service participants which indicates which of the participants are currently using a voice avatar. The indication may comprise the display of a special character such as a '(' before the name (or nickname) of the participant (see FIG. 2a). The display 204 may also indicate the current speaker with a special symbol. For example, FIG. 2a indicates that Tom is the current speaker with an arrow.

Instead of using voice avatars available in the memory 130 of the user's mobile terminal 200, the user may connect to a voice avatar site 400 and select one of the many voice avatars stored in the voice avatar site 400. Once the user has selected a voice avatar, the user can sample the voice avatar, download the voice avatar to the users voice avatar module 100 and save the selected voice avatar to the memory 130. Furthermore, the user may simply save the link for the selected avatar for later use. The link can be a Uniform Resource Locator (URL) of the avatar in the Internet.

Figure 3:
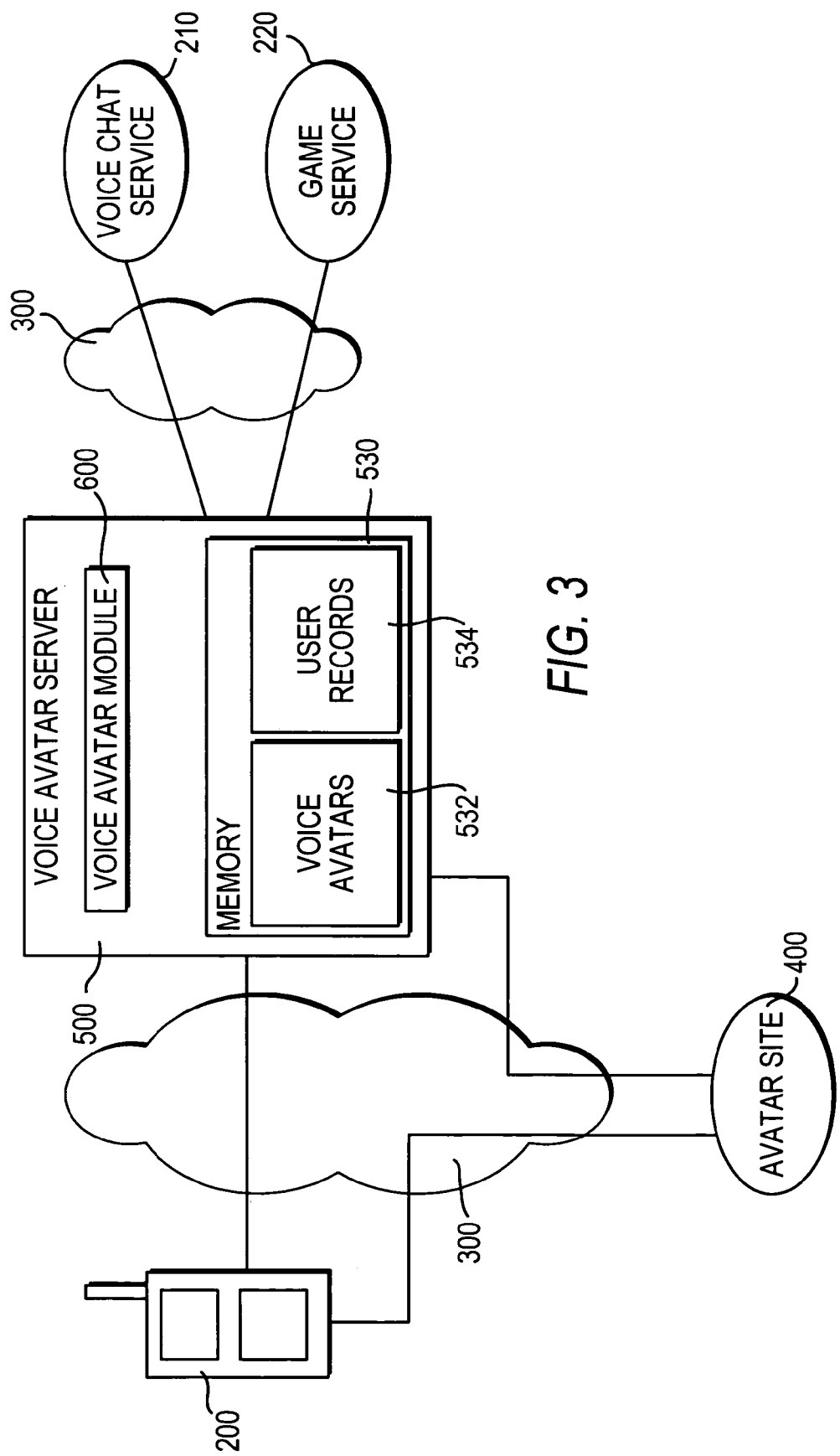
FIG. 3 is a block diagram showing a server-side embodiment of the present invention.

FIG. 3 discloses a server-side embodiment of the present invention in which a voice avatar server 500 includes a voice avatar module 600 with its own selection of voice avatars. In this embodiment, the voice avatars to choose from are stored in a voice avatar section 532 of a memory 530. In this embodiment, the user of the wireless mobile terminal first connects to the voice avatar server 500. Once connected, the user selects from the list of available avatars in the memory 530. The selected voice avatar is then used by the voice avatar module 600 for transforming user's voice when the user communicates via voice communication while connected to any entertainment service such as the entertainment services 210, 220.

The memory 530 also includes user records 534 for all the users registered at the avatar server 500. A user record contains associations of voice avatars 532 with the entertainment services 210, 220. A new association is created when a user connects to a service for the first time. After the user has selected an avatar for this service, the user is associated with that avatar until the user selects another voice avatar. Accordingly, when the user reconnects with the service at a later date, the user begins voice communication with the previous selected voice avatar as the association indicates. Thereby, the user may associate different avatars with different services and store the associations in the user record 534 at the avatar server 500.

Instead of choosing from voice avatars in the memory 530, the voice avatar server 500 may connect with a voice avatar site 400. The wireless mobile terminal 200 may contact the avatar site 400 directly for selecting from a list of voice avatars. In this case, when the voice avatar is selected, the user may sample the selected avatar and/or download the selected avatar to the voice avatars section 532 of the avatar site 500. Alternatively, the user may save the link (i.e., URL) for the selected avatar to his user record 534.

Figure 4:
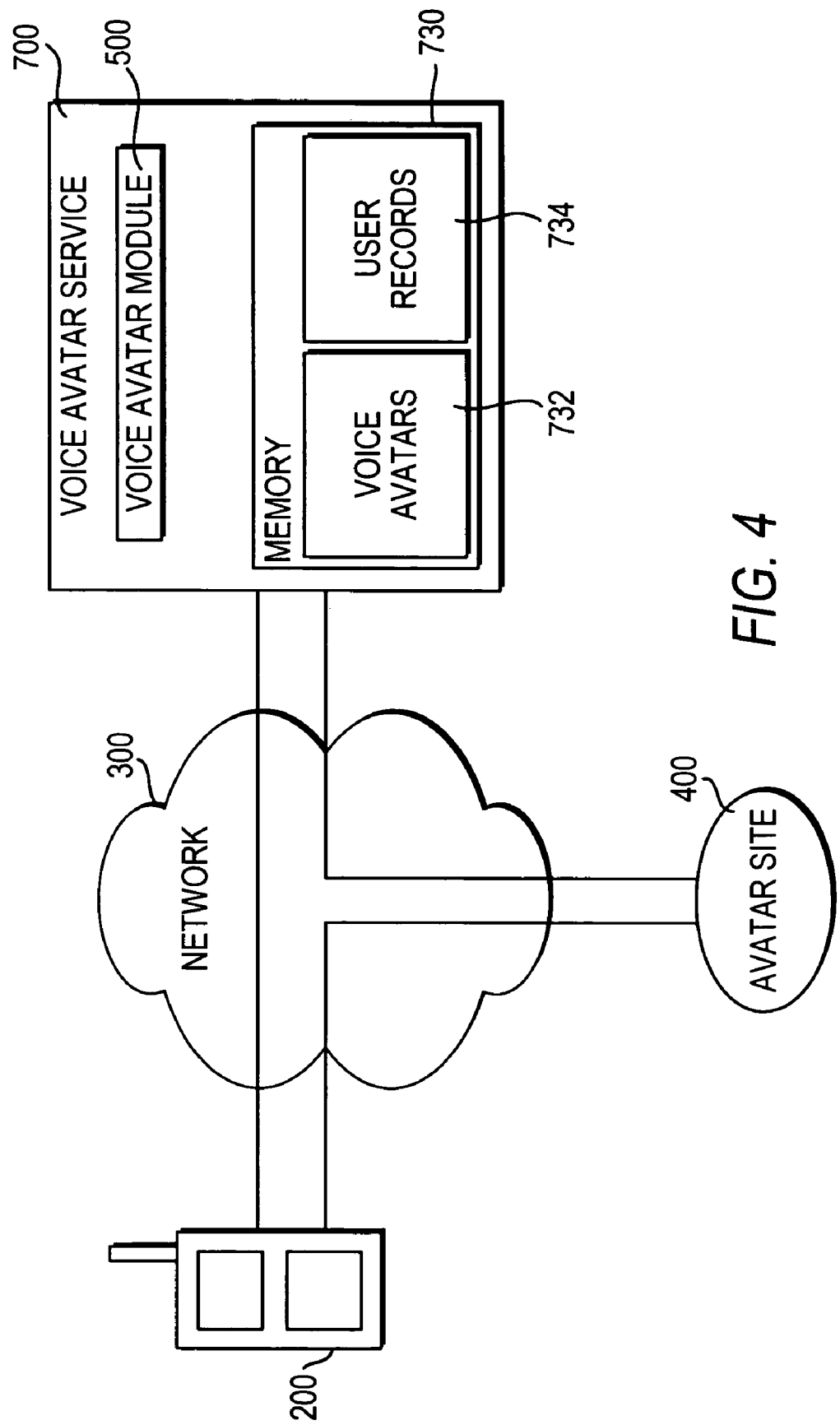
FIG. 4 is a block diagram showing a further server-side embodiment of the present invention.

FIG. 4 shows yet another embodiment in which the voice avatar module 500 is arranged in an entertainment server 700 that allows voice based communication such as a voice chat service. In this embodiment, the user selects a voice avatar for use with the service provided by the entertainment server 700. As described above, the user may select a voice avatar from a voice avatar section 732 in a memory 730. Furthermore, a user record 734 associates the user with a voice avatar so that the user assumes the associated voice avatar when reconnecting to the entertainment server 700. Furthermore, a voice avatar site 400 may be contacted so that a user may select a further voice avatar which may be saved to the voice avatar section 732 of the memory 730. Alternatively, the user may save the link for the selected avatar to his user record 734.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A voice avatar system comprising a server connected to a mobile network and a voice avatar module arranged in said server, said voice avatar module operatively arranged for receiving an input voice channel from a user terminal, modifying the input voice via a first voice avatar to create a modified voice and outputting said modified voice to an output voice channel, wherein said output voice channel is selectively connectable to each of a plurality of services providing voice-based user communication, thereby allowing voice communication using said modified voice between the user and any one of said plural services such that all parties listening to said user via said any one of said plural services hear said modified voice, wherein at least one of said input voice channel and said output voice channel comprises a wireless link.

2. The voice avatar system of claim 1, wherein said server comprises a memory including a plurality of voice avatars and wherein a second voice avatar is selectable from said plural voice avatars via the user terminal for modifying said input voice channel.

3. The voice avatar system of claim 2, wherein said server is connectable to an avatar site via a wireless network for retrieving further voice avatars and saving said further avatars in said memory.

4. The voice avatar system of claim 1, wherein said server is connectable to an avatar site via the wireless network for retrieving further voice avatars.

5. The voice avatar system of claim 1, wherein said output voice channel is selectively connectable via the wireless network to each of a plurality of services having voice-based user communication, thereby allowing voice communication using said modified voice between the wireless mobile terminal and any one of the plural services.

6. The voice avatar system of claim 1, wherein said server comprises one of said plural services providing voice-based user communication, wherein said output voice channel is connectable with said one of said plural services.

7. The voice avatar system of claim 1, wherein said output voice channel is selectively connectable to each of a plurality of services on the Internet providing voice-based user communication.

8. The voice avatar system of claim 7, wherein said voice-based communication uses Voice-over-Internet-Protocol (VoIP).

9. The voice avatar system of claim 1, wherein said voice avatar module is further arranged for sampling the input voice via the first voice avatar to create the modified voice.

10. The voice avatar system of claim 1, wherein a user created voice avatar is storable in said memory.

11. The voice avatar system of claim 1, wherein said one of said plurality of services comprises at least one of a voice chat service and a game service.

12. The voice avatar system of claim 1, wherein said server includes at least one user record including an association of at least one of said plural voice avatars with at least one of said plural services.

13. A method for implementing a voice avatar for wireless communication comprising the steps of:
   selecting, via a wireless terminal, a selected voice avatar from a list including a plurality of voice avatars;
   selecting a selected service from a plurality of available services which allow voice-based communication via wireless terminals;
   connecting the wireless terminal to a voice avatar server having a voice avatar module via a wireless network and connecting the wireless terminal to the selected service through the voice avatar server;
   inputting an input voice from the wireless terminal to the voice avatar module;
   modifying the input voice at the voice avatar module in the voice avatar server by transformation using the selected voice avatar to generate a modified voice; and
   outputting the modified voice from the voice avatar server to the selected service having voice-based communication.

14. The method of claim 13, wherein said step of selecting a selected voice avatar comprises selecting from a memory of the voice avatar module.

15. The method of claim 13, wherein said step of selecting a selected voice avatar comprises selecting from a voice avatar site connected to the wireless network.

16. The method of claim 15, further comprising the step of saving the selected voice avatar to a memory of the voice avatar module.

17. The method of claim 13, further comprising the step of saving the selected voice avatar in a user record for associating a user with the selected voice avatar.

18. The method of claim 13, wherein said step of modifying comprises sampling the input voice via the first voice avatar to create the modified voice.

19. The method of claim 13, further comprising the step of creating, by the user, a voice avatar and storing it in a memory.

20. The method of claim 13, wherein the available services comprise at least one of a voice chat service and a game service.

21. The method of claim 13, further comprising the step of displaying a list indicating a list of current participants in at least one of the available services.

22. The method of claim 21, wherein said step of displaying includes indicating a current speaker with a symbol.

23. The method of claim 13, further comprising the step of associating at least one of the voice avatars with at least one of the available services.

24. A voice avatar server for voice-based communication with a multiuser entertainment services on the Internet, comprising:
   input communication means for receiving an input voice;
   a voice avatar memory for storing a plurality of voice avatars;
   means for allowing user selection of a first avatar of said plural avatars;
   a voice avatar module operatively arranged for receiving the input voice from said communication means, modifying the input voice via the selected first voice avatar to create a modified voice, and outputting said modified voice to an output voice channel; and
   output communication means for transmitting the modified voice on said output voice channel to a selected service providing voice-based user communication, thereby allowing voice communication using said modified voice between the user and the selected service such that all parties listening to the user via the selected service hear said modified voice.

25. The server of claim 24, wherein said voice avatar memory further comprises a record associating at least one of said voice avatars with at least one of the services.

26. The server of claim 24, wherein a second voice avatar is selectable from said plural voice avatars in said memory by a user terminal connected to the server by a mobile network.

27. The server of claim 24, wherein said server is connectable to an avatar site via a wireless network for retrieving further voice avatars and saving said further avatars in said memory.

28. The server of claim 24, wherein said server is connectable to an avatar site via the wireless network for retrieving further voice avatars.

29. The server of claim 24, wherein said output voice channel is selectively connectable via a wireless network to each of a plurality of services having voice-based user communication, thereby allowing voice communication using said modified voice between a wireless mobile terminal and any one of the plural services.

30. The server of claim 24, wherein said server comprises one of said plural services providing voice-based user communication, wherein said output voice channel is connectable with said one of said plural services.

31. The server of claim 24, wherein said output voice channel is selectively connectable to each of a plurality of services on the Internet providing voice-based user communication.

32. The server of claim 24, wherein said voice-based communication uses Voice-over-Internet-Protocol (VoIP).

33. The server of claim 24, wherein said memory includes a record associating a user with a selected voice avatar.

34. A voice avatar module for voice-based communication with a multiuser entertainment services on the Internet, said voice avatar module arranged for receiving the input voice from a communication device over a mobile network, modifying the input voice via the selected first voice avatar to create a modified voice, and outputting said modified voice to an output voice channel, thereby allowing voice communication using said modified voice between the user of the communication device and a selected service such that all parties listening to the user via the selected service hear the modified voice.

35. A voice avatar server for voice-based communication with a multiuser entertainment services on the Internet, including voice avatar module having a memory storing computer executable instructions for receiving the input voice from a communication device via the Internet, modifying the input voice via a first voice avatar to create a modified voice, and outputting the modified voice to an output voice channel, thereby allowing voice communication using the modified voice between the user and the selected service such that all parties listening to the user via the selected service hear the modified voice.

* * * * *